United States Patent

Mendlovic et al.

[11] Patent Number: 6,166,833
[45] Date of Patent: Dec. 26, 2000

[54] ZERO-ORDER COMPUTER GENERATED PHASE-ONLY HOLOGRAMS

[75] Inventors: David Mendlovic, Petach Tikva; Emanuel Marom, Ramat Aviv; Naim Konforti, Holon; Zeev Zalevsky, Rosh Haayin; Gal Shabtay, Petach Tikva, all of Israel

[73] Assignee: Ramot University Authority for Applied Research & Industrial Development Ltd., Tel Aviv, Israel

[21] Appl. No.: 09/536,601

[22] Filed: Mar. 28, 2000

Related U.S. Application Data

[63] Continuation of application No. 08/942,052, Oct. 1, 1997, abandoned.

[30] Foreign Application Priority Data

Oct. 9, 1996 [IL] Israel ........................................ 119380

[51] Int. Cl.[7] ............................... G03H 1/08; G03H 1/00; G02B 5/32; G02B 27/44
[52] U.S. Cl. ..................................... 359/9; 359/15; 359/1; 359/565; 359/569
[58] Field of Search ................................ 359/1, 9, 11, 15, 359/565, 566, 569

[56] References Cited

U.S. PATENT DOCUMENTS 4,124,843 11/1978 Leger et al. .............................. 359/565
5,633,735 5/1997 Hunter et al. .............................. 359/15

*Primary Examiner*—Audrey Chang
*Attorney, Agent, or Firm*—Mark M. Friedman

[57] ABSTRACT

A method for encoding zero-order phase-only holograms, and the holograms so encoded. The amplitude and phase of each point of a discrete mathematical transform, such as a Fourier transform, of an image to be encoded, are encoded as regions of a corresponding pixel of a transparent filter, with suitably selected fractional areas and optical path lengths. The various optical path lengths may be created by manipulating the filter's index of refraction, or by manipulating the thickness of the filter, preferably by etching. Various encoding schemes are presented, appropriate to etching systems with low lateral resolution, to etching systems with high lateral resolution but depth resolution limited to a discrete number of depths, and to etching systems with limited resolution both laterally and in depth.

20 Claims, 10 Drawing Sheets

ZERO-ORDER COMPUTER GENERATED PHASE-ONLY HOLOGRAMS

This is a continuation of U.S. patent application Ser. No. 08/942,052, filed Oct. 1, 1997, now abandoned.

FIELD AND BACKGROUND OF THE INVENTION

The present invention relates to computer generated holograms, and, more particularly, to a method for encoding holograms using only phase.

Holography has always played a major role in the optical data processing field. Traditionally, the recorded complex functions were modulated by a carrier frequency and reconstructed in the first diffraction order (off-axis holography). The flexibility of this method was extremely restricted: Only functions with real impulse response could be generated. The generation of an arbitrary complex function seemed to be far from being realized. The needed flexibility was primarily introduced by Brown and Lohmann (G. R. Brown and A. W. Lohmann (1966), "Complex spatial filtering with binary masks", Applied Optics vol. 6 pp. 967–969), and by Lohmann and Paris (A. W. Lohmann and D. P. Paris (1967), "Binary Fraunhofer holograms generated by computer", Applied Optics vol. 6 pp. 1739–1749), who invented the first computerized encoding method. The holograms generated by this approach were binary, allowing the production of an arbitrary function distribution, and were rapidly generated by a computer. In this approach the Fourier transform of the image desired to be reconstructed was divided into pixels. The amplitude of each filter pixel was encoded by plotting a binary square inside the region of the corresponding hologram pixel. The area (or the cosine of the area) of the plotted square is proportional to the amplitude to be encoded in this pixel. In order to encode the phase, the central location of the square was proportionally shifted from the central location of the pixel's region. The reconstructed image was obtained in the first diffraction order.

In many applications, the wavefronts to be recorded in the holograms have only phase variations. When these wavefronts are recorded as image holograms, they are similar to interferograms. Later on, modified ways of encoding were suggested. An explanation of some of these methods was published by Lee (W. H. Lee (1978), "Computer generated holograms: techniques and applications,", in Progress in Optics, vol. 16 (E. Wolf, ed.) pp. 119–132), and experimental comparison between them was performed by Han and Casasent (C. W. Han and D. P. Casaent (1988), "Experimental comparison of computer generated holograms", Proc. SPIE, vol. 884 pp. 72–80). In each approach, a different mathematical relation connected the location of the square and the area of the square, and the amplitude and the phase that are encoded in the pixel. The common principle of all of those methods is that the reconstructed image is obtained in the first diffraction order. Recently, a method of encoding two functions simultaneously was suggested (D. Mendelovic and I. Kiryuschev (1995), "Two channel computer-generated hologram and its application for optical correlation", Optical Communication vol. 116 pp. 322–325) Here, the two different images are reconstructed in the two orthogonal different first orders.

The main disadvantage of obtaining a reconstruction in the first diffraction order is that the quality of the reconstruction is highly dependent upon the wavelength of illumination. If deviations of the wavelength $\lambda$ occur in the illuminating source, as often happens in the case of practical optical systems and light sources, the quality of reconstruction rapidly decreases, at a rate dependent upon the amount of deviation. Moreover, working in the first diffraction order increases the complexity of the system and often decreases significantly the light efficiency of the system.

There is thus a widely recognized need for, and it would be highly advantageous to have, a method for generating zero diffraction order holograms by computer.

SUMMARY OF THE INVENTION

According to the present invention, there is provided a method for making a hologram filter corresponding to an image having a transform at a plurality of points in transform space, the transform having a transform amplitude, A, and a transform phase, $\phi$, at each of said points, the method comprising the steps of: for each point: (a) encoding A and $\phi$ as at least two encoding phases; and (b) for each of said at least two encoding phases: establishing an encoding optical path length through a part of a pixel in the filter, said encoding optical path length being shorter than a reference optical path length by a number of radians equal to said encoding phase modulo $2\pi$.

According to the present invention, there is provided a hologram filter corresponding to an image having a transform at a plurality of points in transform space, the transform having a transform amplitude, A, and a transform phase, $\phi$, at each of the points, the filter comprising a substantially transparent sheet, at least a portion of said sheet being subdivided into a plurality of pixels, each of said pixels corresponding to a point in transform space, a first partition of each of said pixels having an optical path length shorter than a reference optical path length by a number of radians equal to a first encoding phase, derived from A and $\phi$ of the corresponding point, modulo $2\pi$, and a second partition of each of said pixels having an optical path length shorter than said reference optical path length by a number of radians equal to a second encoding phase, derived from A and $\phi$ of the corresponding point, modulo $2\pi$.

FIG. 1 shows a portion of a hologram filter according to the present invention. Filter 100 is a sheet of a substantially transparent material, containing an array of pixels 102, 104, 106, and other pixels not numbered. According to the prior art, each pixel of a hologram filter is provided with a single optical path length. According to the present invention, the area of each pixel is subdivided into a small number of partitions, each with its own optical path length. In FIG. 1 pixel 102 is shown with two partitions, 121 and 122; pixel 104 is shown with two partitions. 141 and 142; and pixel 106 is shown with two partitions, 161 and 162. Although the array of pixels shown in FIG. 1 is a rectangular array, the scope of the present invention includes all suitable array geometries, for example, hexagonal and triangular arrays.

The principle of the present invention is to encode the amplitude and the phase of the transform, in each pixel, as two or more encoding phases. Each encoding phase is realized physically in the filter as an encoding optical path length through one of the partitions of the pixel, with each encoding optical path length being shorter than some global reference optical path length by a number of radians equal to the corresponding encoding phase, modulo $2\pi$. Encoding the amplitude and the phase of the transform in each pixel as two encoding phases is superior to encoding the amplitude and phase of the transform as an encoding phase and an encoding attenuation, for two reasons. First, the light incident on the filter suffers less overall attenuation using phase-only encoding. Second, it is harder to make zero diffraction order filters with combined phase and attenuation encoding than to make phase-only zero diffraction order filters. It is implicit in the present invention that each filter is appropriate only to light of one particular frequency, so that a specific number of radians corresponds to a specific physical path length.

There are many ways to achieve different optical path lengths through different parts of the filter. One way is to vary the filter's index of refraction laterally. For light of a given frequency, a lower refractive index corresponds to a longer wavelength, or fewer radians per unit optical path length through the filter. If the reference optical path length is the thickness of the unmodified filter, then a shorter encoding path length is achieved by reducing the index of refraction appropriately. Another way is to vary the thickness of a filter of constant index of refraction. If the wavelength of the light in the filter is $\lambda$, and the phase to be encoded at one site in the filter is $\phi$, then the thickness of the filter must be reduced by a physical length of $\lambda\phi/2\pi$ modulo $\lambda$ relative to a reference thickness. Note that the "modulo $\lambda$" in this expression allows the "shortening" of the physical path length to be negative, meaning that equivalent results may be achieved by increasing the thickness of the filter by an appropriate amount. Thus, the thickness of the filter may be altered by adding material (e.g., photodeposition), or by removing material (e.g., etching).

The preferred filter fabrication method of the present invention is etching, using a plasma etching device. In recent years, etching approaches have been developed rapidly and thus obtaining many etching depths levels (gray levels) in a suitable substrate is much easier than obtaining amplitude gray levels. The reconstruction obtained yields relatively high light efficiency.

In general, the accuracy of the encoded hologram depends on both the lateral resolution of the plasma etching device and on its depth resolution. The various preferred embodiments of the method of the present invention are oriented towards different tradeoffs of lateral resolution vs. depth resolution, as is described below.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method of making filters for generating holograms. Specifically, the present invention can be used to generate zero diffraction order holograms encoded in phase only.

The principles and operation of hologram encoding according to the present invention may be better understood with reference to the drawings and the accompanying description.

Figure 1:
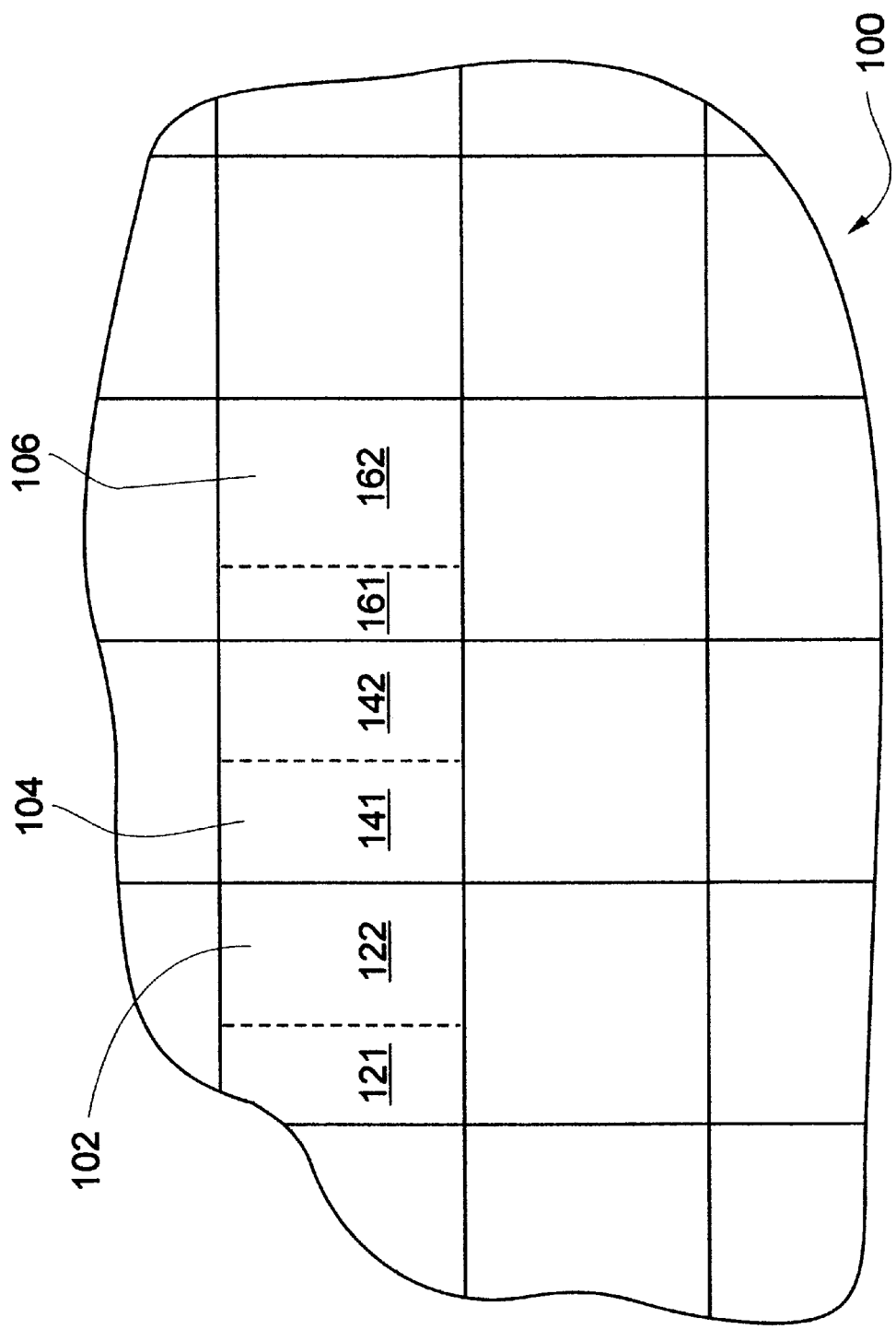
FIG. 1 is a schematic illustration of a portion of a hologram filter according to the present invention.
Figure 2:
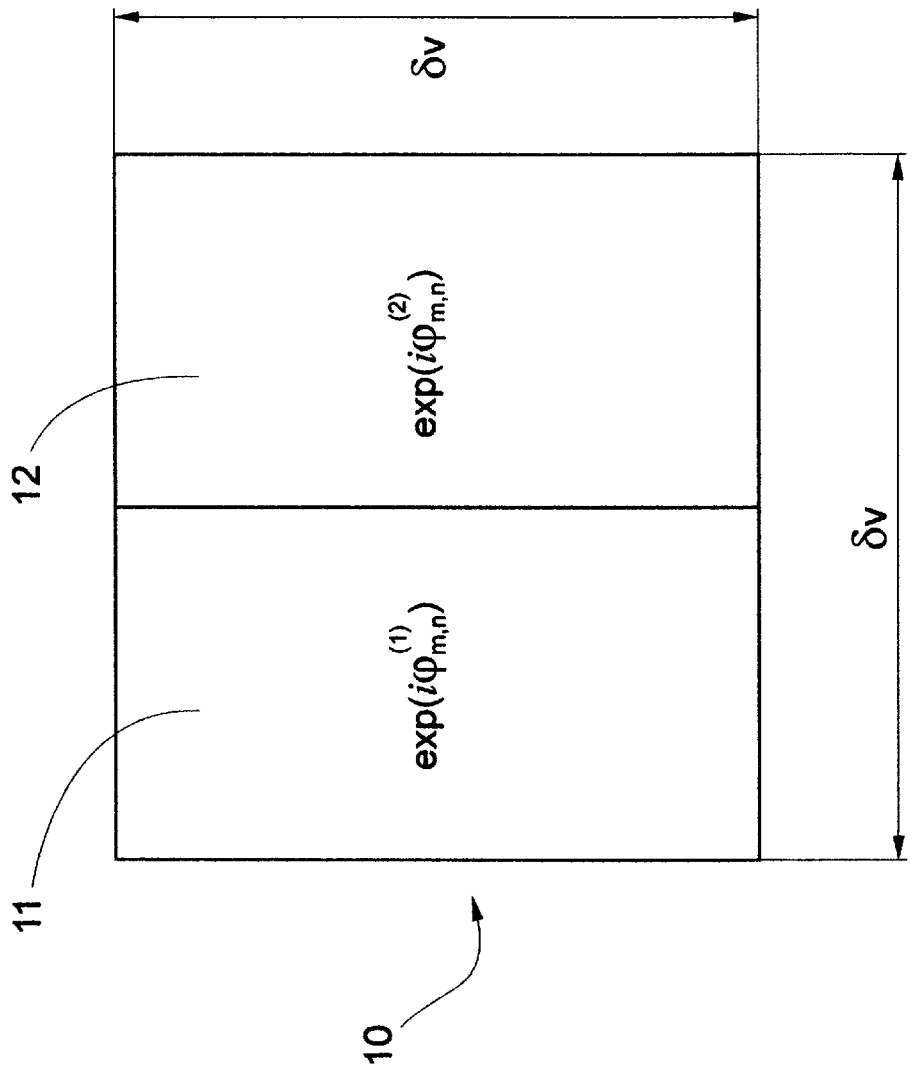
FIG. 2 is a top view of a hologram filter pixel according to the first preferred embodiment of the present invention, in which the two partitions are of equal area.
Figure 3:
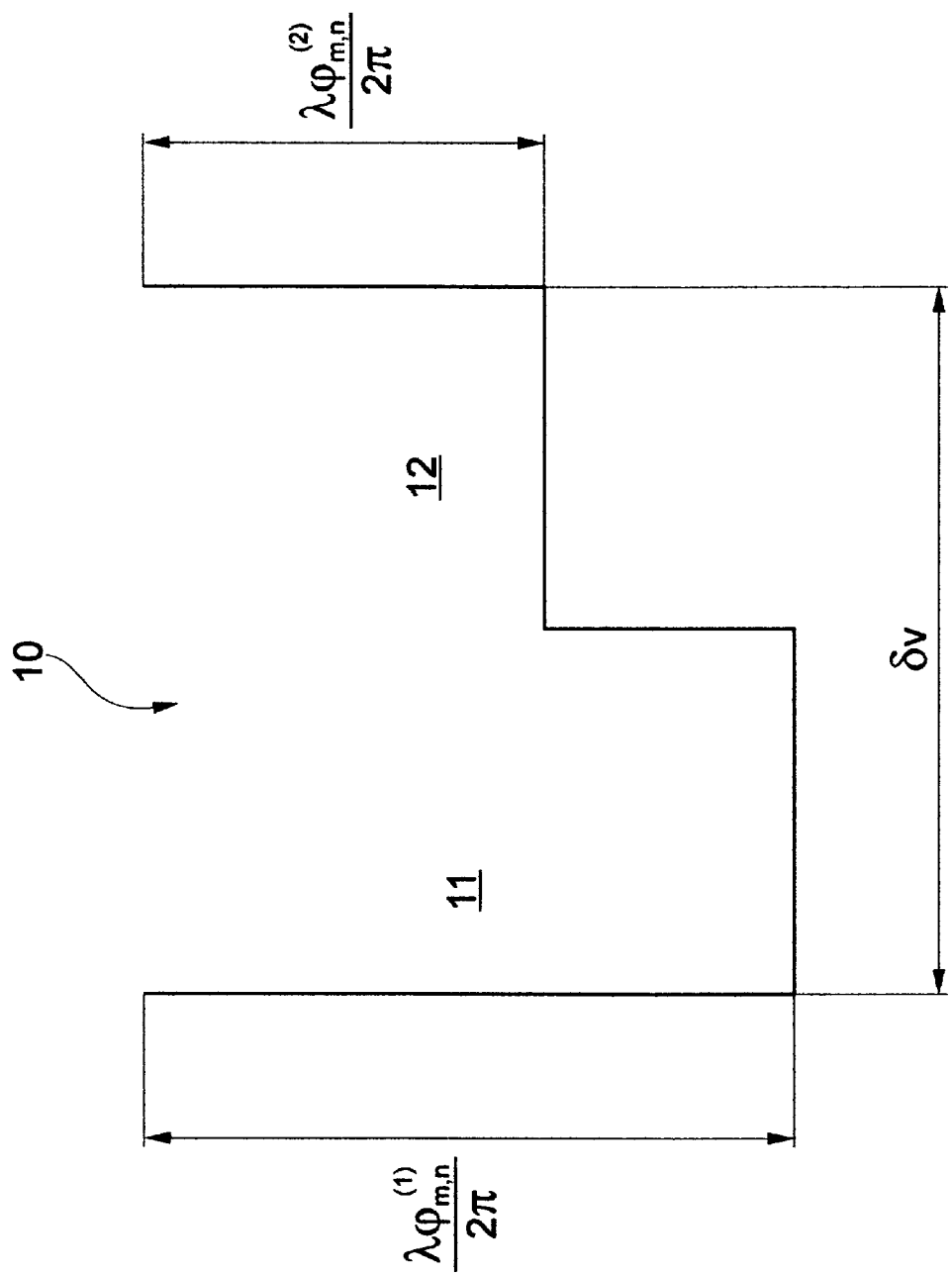
FIG. 3 is a side view of a hologram filter pixel according to the first preferred embodiment of the present invention, in which the two partitions are of unequal area.

Referring now to the drawings, the simplest form of the first embodiment of the present invention is illustrated in FIGS. 2 and 3. This form of the first embodiment is appropriate for etching systems with high depth resolution and low lateral resolution. In this special case of the first embodiment of the present invention, the encoded free parameters are two phases, $\phi^{(1)}$ and $\phi^{(2)}$, etched as depths in two halves of each pixel. FIG. 2 is a top view of an encoded pixel 10. FIG. 3 is a side view of encoded pixel 10. This preferred embodiment is applicable to an etching system with low lateral resolution, because the hologram is encoded as phases etched in pixel partitions of fixed dimension, and not as the areas of the partitions. The proof that both the amplitude and the phase of the image can be encoded as two phases in this way is as follows:

The mathematical representation of the Fourier transform of the image is $$H(v_x, v_y) = \sum_m \sum_n \text{rect}\left(\frac{2v_x}{\delta v}\right)\text{rect}\left(\frac{v_y}{\delta v}\right) * \\ \left[\begin{array}{l} \exp(i\varphi_{m,n}^{(1)})\delta\left(v_x - \left(m + \frac{1}{4}\right)\delta v\right)\delta\left(v_y - \left(n + \frac{1}{2}\right)\delta v\right) + \\ \exp(i\varphi_{m,n}^{(2)})\delta\left(v_x - \left(m + \frac{3}{4}\right)\delta v\right)\delta\left(v_y - \left(n + \frac{1}{2}\right)\delta v\right) \end{array}\right] \quad (1)$$

where * denotes convolution, $\delta v$ denotes the size of a pixel, and $\delta$ is the Dirac delta function. Indices m and n are over a rectangular array of hologram pixels.

Let $h(xy)$ be the inverse Fourier transform of $H(v_x,v_y)$:

$$h(x, y) = \frac{\delta v^2}{2}\exp\left(i2\pi y\frac{\delta v}{2}\right)\sum_m\sum_n\left\{\text{sinc}\left(\frac{x\delta v}{2}\right)\text{sinc}(y\delta v)\cdot \\ \left[\exp(i\varphi_{m,n}^{(1)})\exp\left(i2\pi x\frac{\delta v}{4}\right) + \\ \exp(i\varphi_{m,n}^{(2)})\exp\left(i2\pi\frac{3x}{4}\delta v\right)\right]\cdot\exp(i2\pi\delta v(xm + yn))\right\} \quad (2)$$

where sinc(x) is defined as $\sin(\pi x)/\pi x$. Because the inverse Fourier transform of the encoded function is in the zero diffraction order, the following assumptions can be made based on the fact that the spatial coordinates x and y are small:

$x\delta v \ll 1$; $y\delta v \ll 1$;

and thus $\text{sinc}(x\delta v)=1$; $\exp(i2\pi x\delta v)=1$; $\text{sinc}(y\delta v)=1$.

Hence, using these relations, the function $h(x,y)$ may be formulated as:

$$h(x, y) \approx \frac{\delta v^2}{2} \sum_m \sum_n [\exp(i\varphi_{m,n}^{(1)}) + \exp(i\varphi_{m,n}^{(2)})] \qquad (3)$$

$$\exp(i2\pi(xm + yn)\delta v)$$

For the continuous case, the reconstruction of the image placed in the Fourier plane is:

$$h(x, y) = \int_{-\infty}^{\infty} \int_{-\infty}^{\infty} H(v_x, v_y)\exp(i2\pi(xv_x + yv_y))dv_x dv_y \qquad (4)$$

In a discrete system, the Fourier transform of the image can be expressed as:

$$H(m\delta v, n\delta v) = A_{m,n} \exp(i\phi m, n)$$

Thus, the Fourier integral may be written as a sum, where:

$$h(x, y) = (\delta v^2) \sum_m \sum_n H(m\delta v, n\delta v)\exp(i2\pi(xm + yn)\delta v) \qquad (5)$$

Rearranging the elements in Equation (3) gives the following equation:

$$h(x, y) = (\delta v^2) \sum_m \sum_n \cos\left(\frac{\varphi_{m,n}^{(1)} - \varphi_{m,n}^{(2)}}{2}\right) \qquad (6)$$

$$\exp\left(i\frac{\varphi_{m,n}^{(1)} + \varphi_{m,n}^{(2)}}{2}\right)\exp(i2\pi(xm + yn)\delta v)$$

A comparison between Equations (5) and (6) yields that the amplitude and phase of each pixel is determined uniquely by the values of $\phi^{(1)}_{m,n}$ and $\phi^{(2)}_{m,n}$ of each pixel as:

$$A_{m,n} = \cos\left(\frac{\varphi_{m,n}^{(1)} - \varphi_{m,n}^{(2)}}{2}\right) \text{ and} \qquad (7)$$

$$\varphi_{m,n} = \frac{\varphi_{m,n}^{(1)} + \varphi_{m,n}^{(2)}}{2} \qquad (8)$$

This embodiment of the method of the present invention reconstructs the Fourier transform of the encoded function in the zero diffraction order. The scope of the present invention includes other transformations that relate the encoded function with the distribution obtained in the output plane. For example, the reconstruction may be applied over the Fresnel transform of the encoded function, or over the Fractional Fourier Transform of the encoded function.

Figure 4:
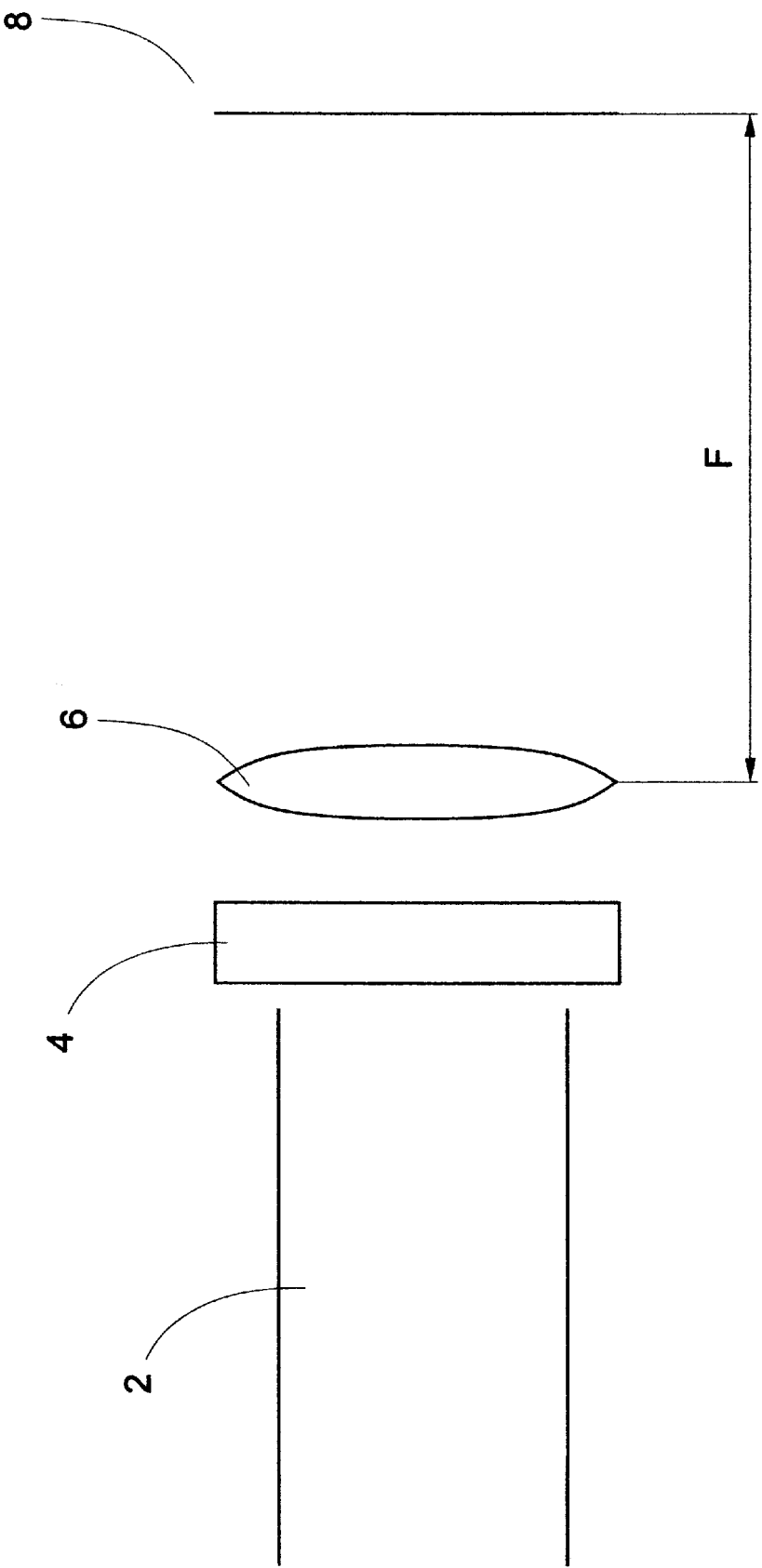
FIG. 4 is a schematic diagram of a hologram reconstruction scheme based on the present invention.

The above derivation used dimensionless coordinates in real space (x,y) and in transform space ($v_x, v_y$). In fact, the physical reconstruction of the image from the hologram is accomplished using the setup diagrammed schematically in FIG. 4. Coherent light 2 of wavelength $\lambda$ is incident on a zero diffraction order hologram 4 and a lens 6 of focal length F. An image 8 is reconstructed at a distance F from lens 6. The relationships between physical dimensions $\delta v$ of the pixels of hologram 4 and the maximum physical dimensions ($x_{max}, y_{max}$) of image 6 that validate the above derivation are $x_{max}\delta v/\lambda F<<1$ and $y_{max}\delta v/\lambda F<<1$. Similarly, the physical depths to which the two halves of pixel (m,n) of the substrate of the physical hologram are etched are in units of $\lambda/2\pi$: Left half 11 of pixel 10 in FIGS. 2 and 3 is etched to a depth of $\lambda\phi^{(1)}_{m,n}/2\pi$ modulo $\lambda$, and right half 12 of pixel 10 in FIGS. 2 and 3 is etched to a depth of $\lambda\phi^{(2)}_{m,n}/2\pi$ modulo $\lambda$. Note that $\lambda$ here is the wavelength of the light in the filter, not the wavelength of the light in free space.

The partition of pixel 10 shown in FIGS. 2 and 3 is illustrative. The scope of this embodiment of the present invention includes all ways of dividing a pixel into two partitions of equal area. In general, the scope of the various embodiments of the present invention includes all ways of dividing a pixel into partitions that span appropriate fractions of the area of the pixel, regardless of the shapes of the partitions.

Figure 5:
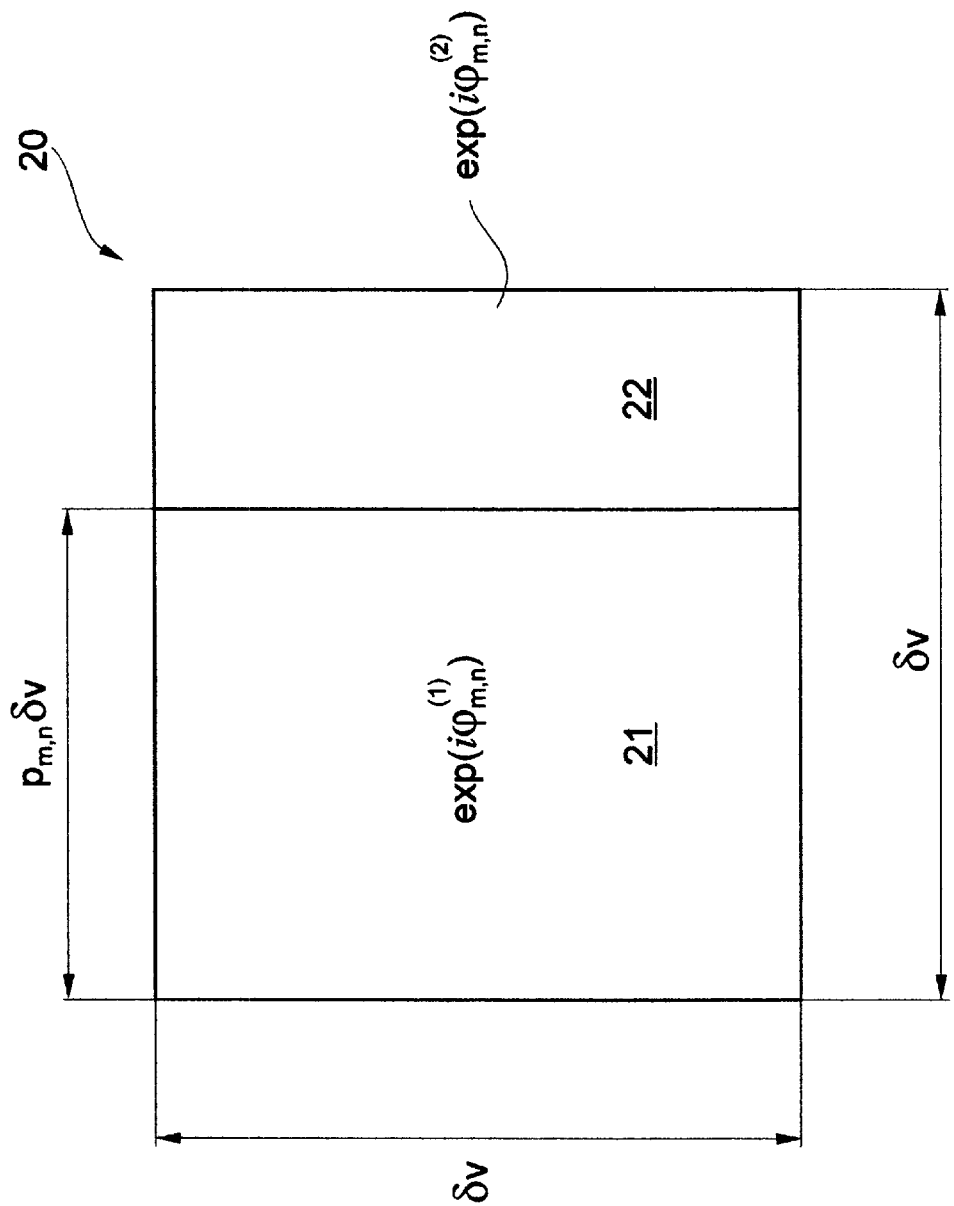
FIG. 5 is a top view of a hologram filter pixel according to the first preferred embodiment of the present invention in which the two partitions are of unequal area.
Figure 6:
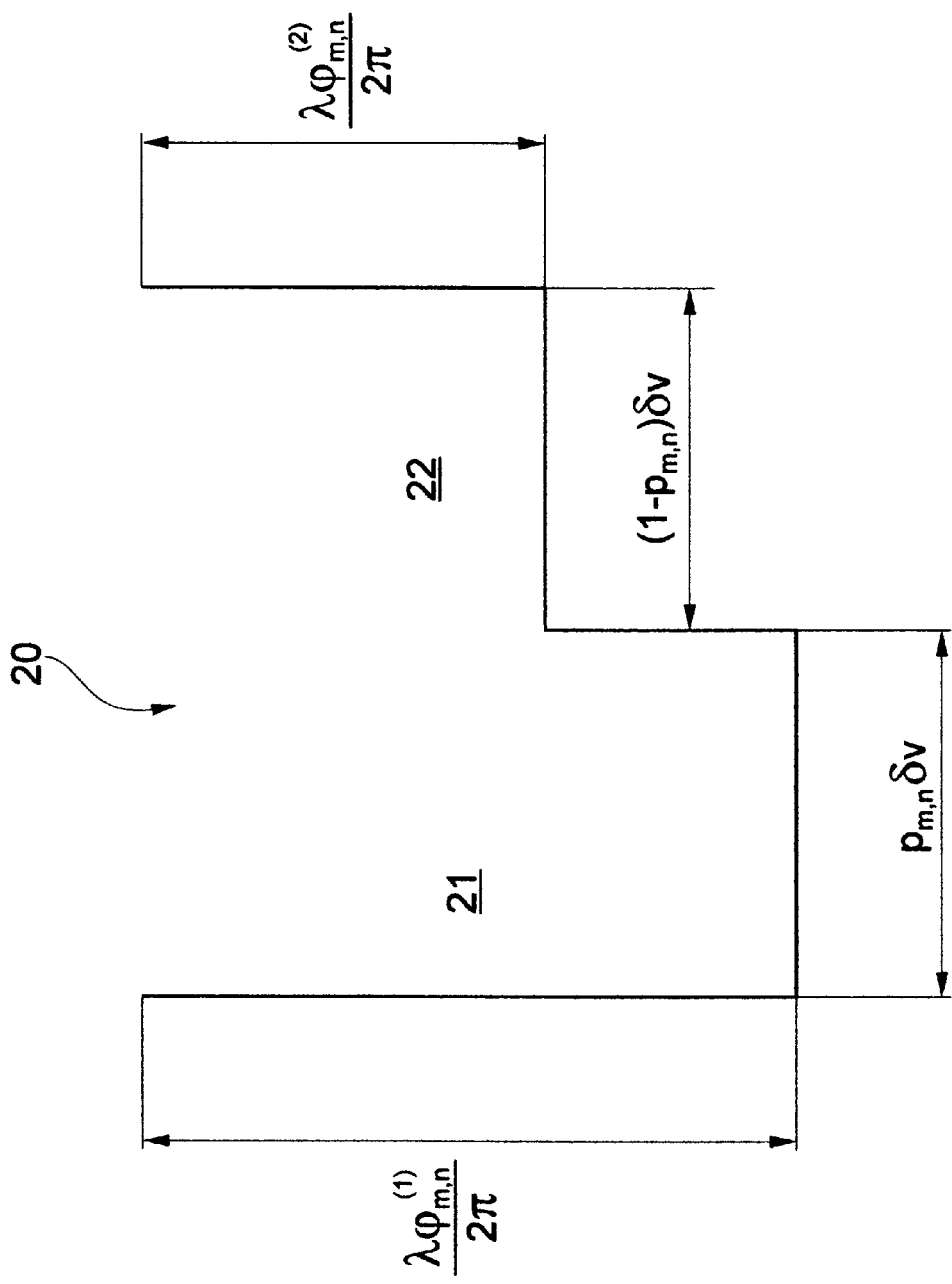
FIG. 6 is a side view of a hologram filter pixel according to the first preferred embodiment of the present invention in which the two partitions are of unequal area.

The most general form of the first embodiment of the present invention is illustrated in FIGS. 5 and 6, which show an encoding that uses three free parameters, the two phases $\phi^{(1)}_{m,n}$ and $\phi^{(2)}_{m,n}$, and the fraction, $p_{m,n}$, of a pixel 20 occupied by left-hand-side partition 21. FIG. 5 is a top view of encoded pixel 20, and FIG. 6 is a side view of encoded pixel 20. The mathematical expression for this configuration may be written in dimensionless coordinates as:

$$H(v_x, v_y) = \qquad (9)$$

$$\sum_m \sum_n \left\{ \text{rect}\left(\frac{v_x}{p_{m,n}\delta v}\right)\text{rect}\left(\frac{v_y}{\delta v}\right) * \left[\exp(i\varphi_{m,n}^{(1)})\delta\left(v_x - \left(m + \frac{p_{m,n}}{2}\right)\delta v\right)\right.\right.$$

$$\left.\delta\left(v_y - \left(n + \frac{1}{2}\right)\delta v\right)\right] + \text{rect}\left(\frac{v_x}{(1 - p_{m,n})\delta v}\right)\text{rect}\left(\frac{v_y}{\delta v}\right) * \left[$$

$$\left.\exp(i\varphi_{m,n}^{(2)})\delta\left(v_x - \left(m + \frac{p_{m,n} + 1}{2}\right)\delta v\right)\delta\left(v_y - \left(n + \frac{1}{2}\right)\delta v\right)\right]\right\}$$

whose inverse Fourier transform is:

$$h(x, y) = (\delta v)^2 \sin c(y\delta v)\exp\left(i2\pi y\frac{\delta v}{2}\right). \qquad (10)$$

$$\sum_m \sum_n \left[\exp(i\varphi_{m,n}^{(1)})p_{m,n}\sin c(p_{m,n}x\delta v)\exp\left(i2\pi x\frac{p_{m,n}}{2}\delta v\right) +\right.$$

$$\exp(i\varphi_{m,n}^{(2)})(1 - p_{m,n})\sin c((1 - p_{m,n})x\delta v)$$

$$\left.\exp\left(i2\pi x\frac{p_{m,n} + 1}{2}\delta v\right)\right]\exp(i2\pi\delta v(xm + yn))$$

Using the approximations for the exp and sinc functions derived above gives $$h(x, y) \approx (\delta v)^2 \sum_m \sum_n [ \qquad (11)$$

$$p_{m,n}\exp(i\varphi_{m,n}^{(1)}) + (1 - p_{m,n})\exp(i\varphi_{m,n}^{(2)})]\exp(i2\pi(xm + yn)\delta v)$$

from which it can be concluded that $$A_{m,n} = \sqrt{2p_{m,n}^2 - 2p_{m,n} + 1 + p_{m,n}(1 - p_{m,n})\cos(\varphi_{m,n}^{(1)} - \varphi_{m,n}^{(2)})} \qquad (12)$$

and $$\varphi_{m,n} = \tan^{-1}\left[\frac{p_{m,n}\sin\varphi_{m,n}^{(1)} + (1 - p_{m,n})\sin\varphi_{m,n}^{(2)}}{p_{m,n}\cos\varphi_{m,n}^{(1)} + (1 - p_{m,n})\cos\varphi_{m,n}^{(2)}}\right] \qquad (13)$$

Note that equations (7) and (8) are a special case of equations (12) and (13), specifically, the case in which $p_{m/n}=\frac{1}{2}$.

The formulation of the present invention expressed by equations (12) and (13) is appropriate for an etching system with high lateral resolution but depth resolution that is limited to a discrete number of depths, i.e., a discrete number Q of phases $\phi_q$. Equations (12) and (13) constitute two equations for three unknowns. These three unknowns are the phase $\phi^{(1)}_{m,n}$ of first pixel partition 21, the phase $\phi^{(2)}_{m,n}$ of second pixel partition 22, and the fraction $p_{m,n}$ of the area of pixel 20 occupied by first partition 21. The allowed values of the phases $\phi^{(1)}_{m,n}$ and $\phi^{(2)}_{m,n}$ are the Q discrete values $\phi_q$. Equations (12) and (13) may be solved by brute force: construct all possible pairs ($\phi^{(1)}_q, \phi^{(2)}_q$) of phases; for each pair, solve equations (12) and (13) separately for trial values of $p_{m,n}$; and select as the solution the "best" pair, i.e., the pair whose two trial values of $p_{m,n}$ are closest to each other. The value of $p_{m,n}$ actually taken as the solution is the average of the two "best" trial values. Alternatively, equation (12) may be solved for each phase pair, and the resulting trial value of $p_{m,n}$ plugged in, along with the phase pair, to equation (13) to predict a value of $\phi_{m,n}$, the "best" phase pair being the one whose predicted value of $\phi_{m,n}$ comes closest to the value of $\phi_{m,n}$ to be encoded in the pixel; or equation (13) may be solved for each phase pair, and the resulting trial value of $p_{m,n}$ plugged in, along with the phase pair, to equation (12) to predict a value of $A_{m,n}$, the "best" phase pair being the one whose predicted value of $A_{m,n}$ comes closest to the value of $A_{m,n}$ to be encoded in the pixel. In these two alternative solution methods, the value of $p_{m,n}$ actually taken as the solution is the trial value of $p_{m,n}$ corresponding to the "best" phase pair.

As before, the physical depths to which partitions 21 and 22 of pixel 20 are etched are $\lambda\phi^{(1)}_{m,n}/2\pi$ modulo $\lambda$ for first partition 21. and $\lambda\phi^{(2)}_{m,n}/2\pi$ modulo $\lambda$ for second partition 22. Also as before, partitions 21 and 22 need not be rectangular, as shown in FIG. 5, but may have any shape, as long as first partition 21 occupies a fraction $p_{m,n}$ of the area of pixel 20 and second partition 22 occupies a fraction $(1-p_{m,n})$ of the area of pixel 20.

Figure 7:
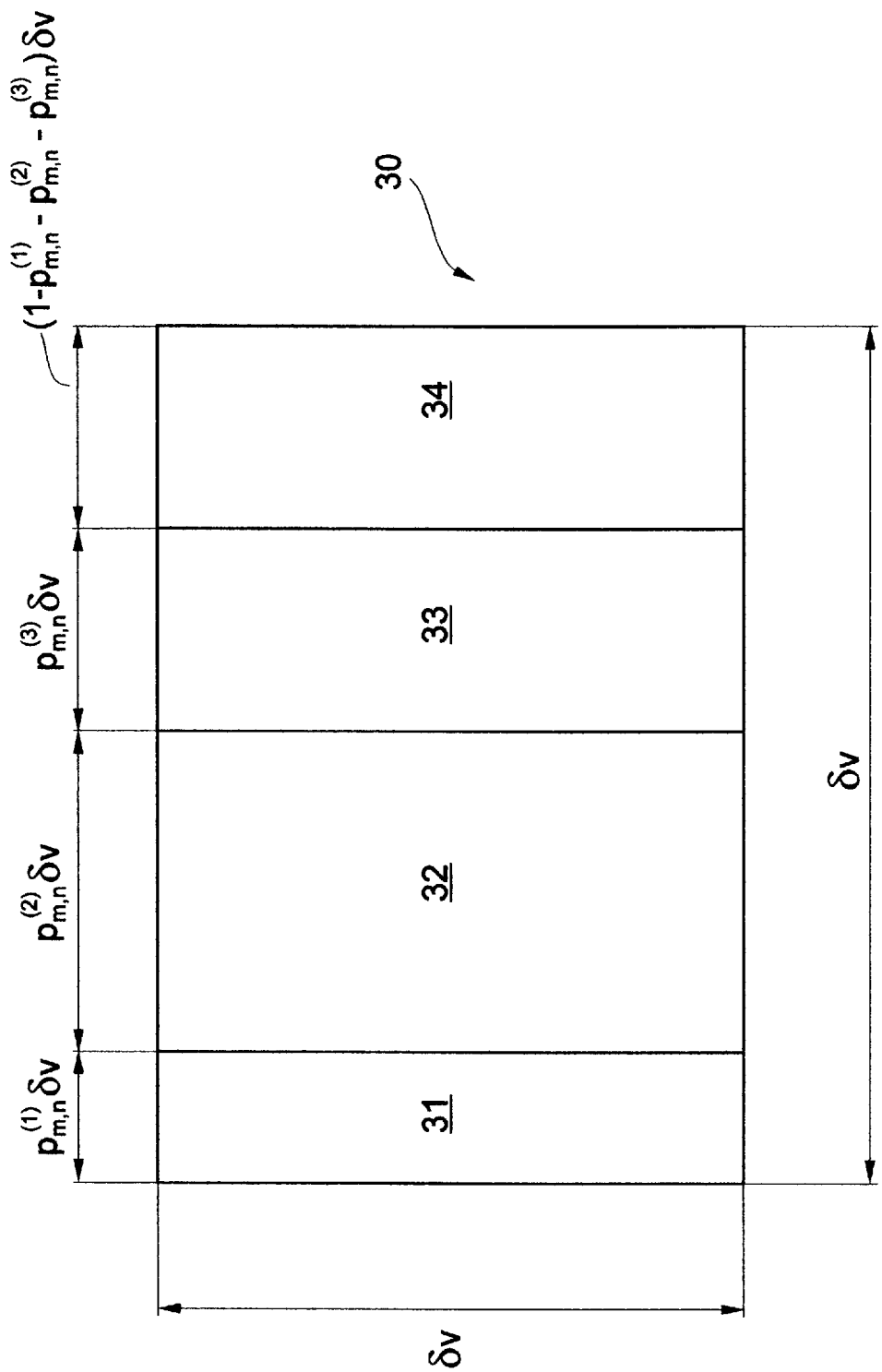
FIG. 7 is a top view of a hologram filter pixel according to the second preferred embodiment of the present invention.
Figure 8:
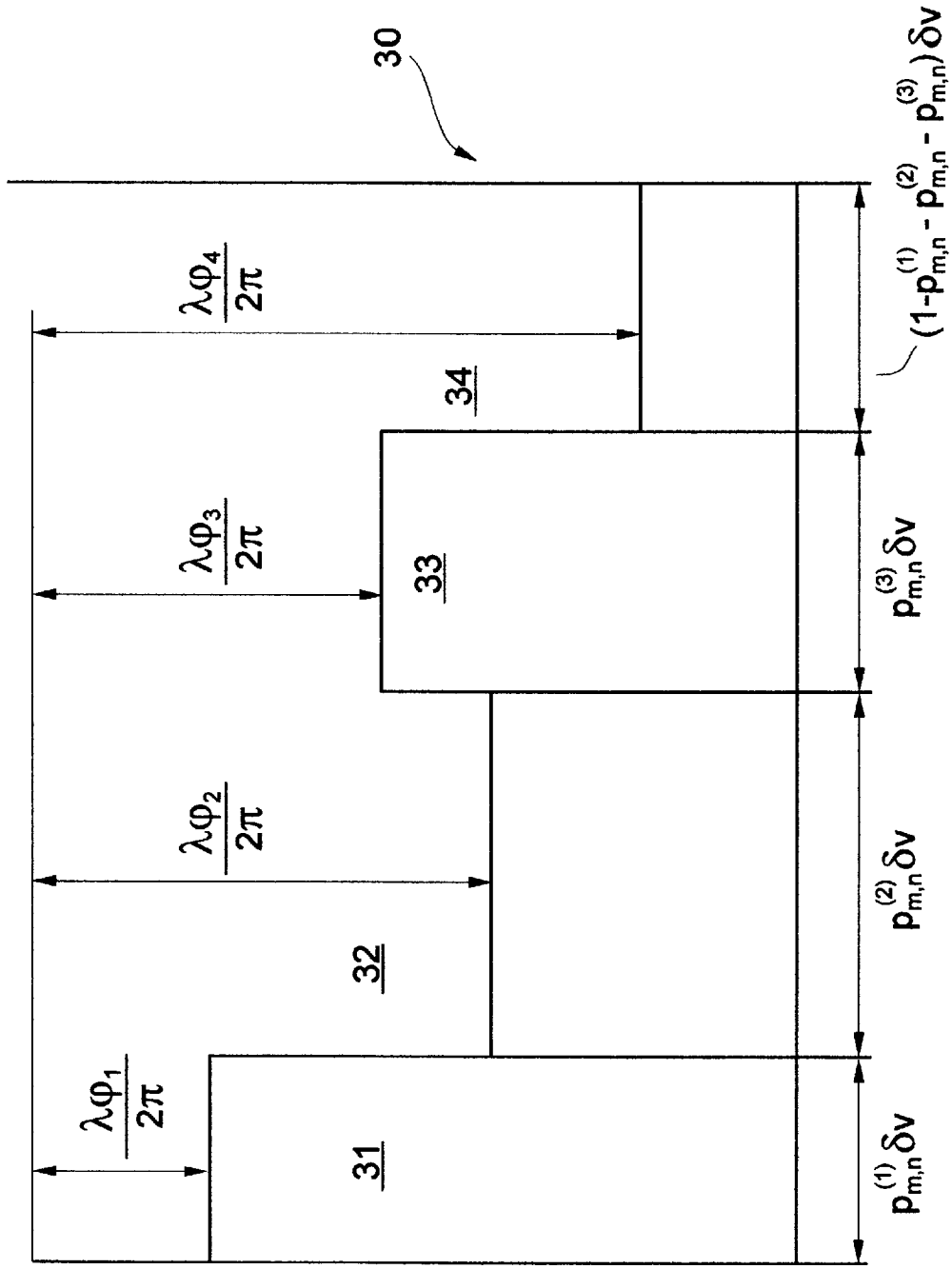
FIG. 8 is a side view of a hologram filter pixel according to the second preferred embodiment of the present invention.

The second preferred embodiment of the present invention is appropriate to an etching system that has high spatial resolution but depth resolution that is limited to four depths, corresponding to four encoding phases, $\phi_1, \phi_2, \phi_3$, and $\phi_4$. As shown in FIGS. 7 and 8, this preferred embodiment uses three free parameters to define four pixel partitions 31, 32, 33, and 34. The three parameters are three area fractions, $p^{(1)}_{m,n}, p^{(2)}_{m,n}$, and $p^{(3)}_{m,n}$. FIG. 7 shows a top view of a pixel 30 encoded according to the second preferred embodiment of the present invention, and FIG. 8 shows a side view of pixel 30. A derivation analogous to the ones presented above gives the following equation for the area fractions:

$$\sum_{l=1}^{3} p^{(l)}_{m,n}\exp(i\varphi_l) + \left(1 - \sum_{l=1}^{3} p^{(l)}_{m,n}\right)\exp(i\varphi_4) = A_{m,n}\exp(i\varphi_{m,n}) \quad (14)$$

Two of the three free parameters are needed to encode the two inputs $A_{m,n}$ and $\phi_{m,n}$. The third free parameter is used to keep the area fractions positive.

Figure 9:
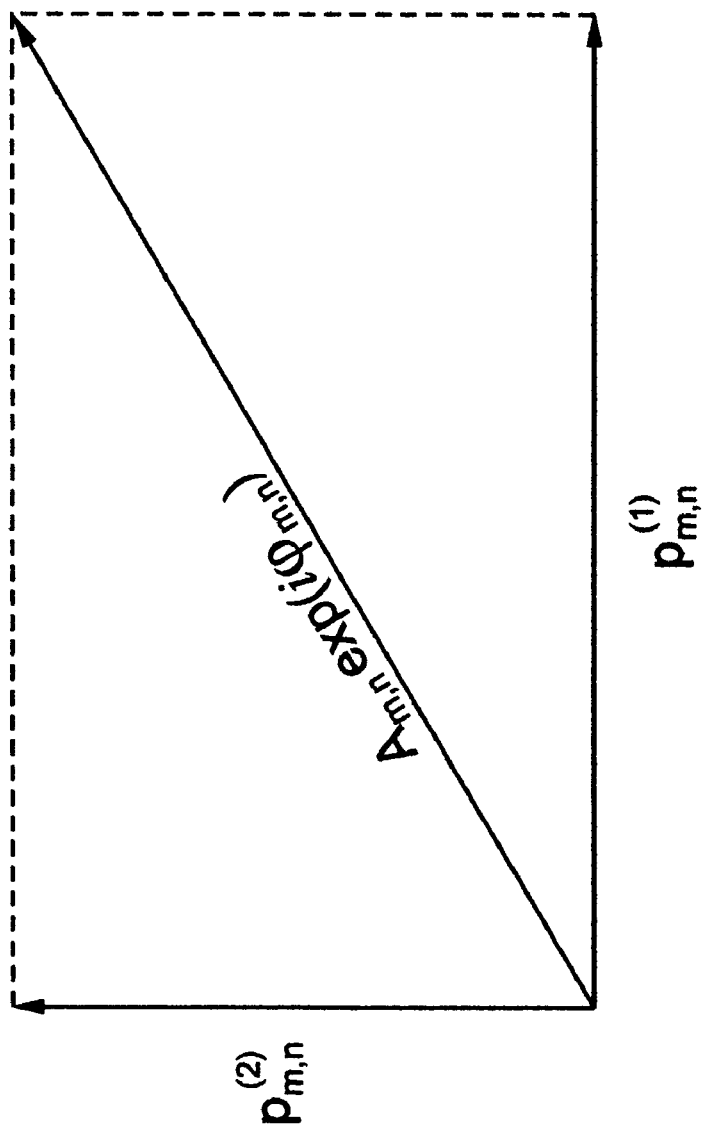
FIG. 9 shows the encoding scheme of the second preferred embodiment of the present invention.

The most preferred values of the four encoding phases are $\phi_1=0, \phi_2=\pi/2, \phi_3=\pi$, and $\phi_4=3\pi/2$. FIG. 9 shows a way of solving equation (14) using these encoding phases. The phasor $A_{m,n}\exp(i\phi_{m,n})$ is projected over the two axes that bound its quadrature. This determines two of the three area fractions. In the example shown in FIG. 8, these two area fractions are $p^{(1)}_{m,n}$ and $p^{(2)}_{m,n}$. The rest of the pixel is partitioned into two equal areas, i.e., $p^{(3)}_{m,n}=1-p^{(1)}_{m,n}-p^{(2)}_{m,n}-p^{(3)}_{m,n}$, or, solving for $p^{(3)}_{m,n}, p^{(3)}_{m,n}=(1-p^{(1)}_{m,n}-p^{(2)}_{m,n})/2$. These two equal area partitions 33 and 34 are arbitrarily assigned opposite phases, for example 0 and $\pi$, or $\pi/2$ and $3\pi/2$, so that their contributions to the reconstructed image will cancel each other, leaving only the contributions of partitions 31 and 32. Note that in this preferred embodiment of the present invention, the amplitude $A_{m,n}$ must be normalized to a maximum of $1/\sqrt{2}$, to make sure that none of the area fractions exceed unity.

As in the first preferred embodiment, the physical depths corresponding to the four encoding phases are the encoding phases multiplied by $\lambda/2\pi$: $\lambda\phi_1/2\pi$ modulo $\lambda$, $\lambda\phi_2/2\pi$ modulo $\lambda$, $\lambda\phi_3/2\pi$ modulo $\lambda$, and $\lambda\phi_4/2\pi$ modulo $\lambda$. Also as in the first preferred embodiment, partitions 31, 32, 33, and 34 may have any shape, as long as each partition occupies its corresponding fraction of the pixel area.

Figure 10:
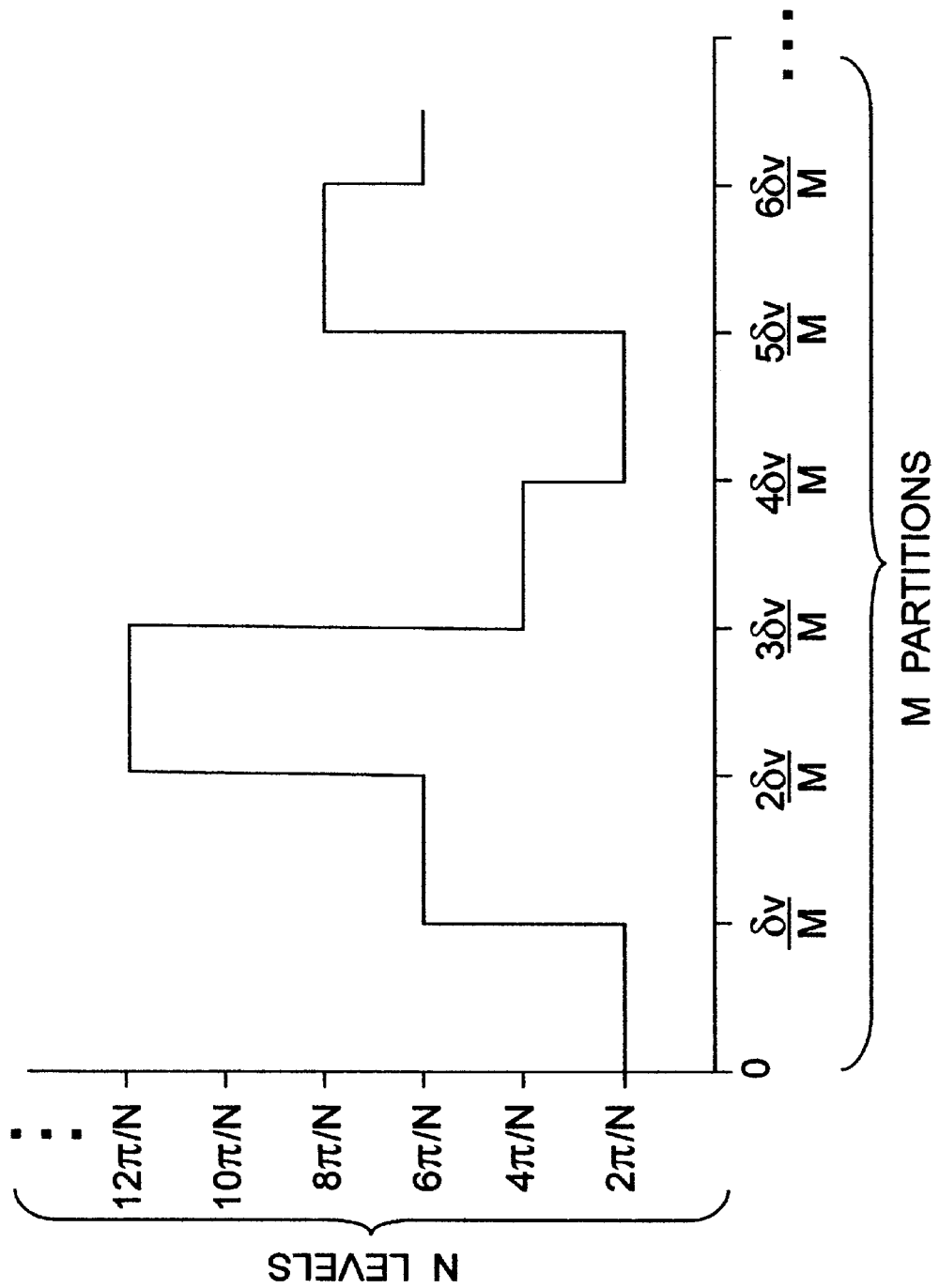
FIG. 10 shows the depth encoding scheme of the third preferred embodiment of the present invention.

The third preferred embodiment of the present invention is appropriate to an etching system with limited resolution both laterally and in depth. Suppose that the lateral resolution is a fraction $1/M$ of the pixel width $\delta v$, se that the positions of the partition boundaries are quantized in multiples of $\delta v/M$, as shown in FIG. 10. Suppose further that the vertical resolution is $2\pi/N$ radians relative to the wavelength $\lambda$. Then, analogously to the other two preferred embodiment, the equation for the M encoding phases $\{\phi_1\}$ is:

$$\frac{1}{M}\sum_{l=1}^{M} \exp(i\varphi_l) = A_{m,n}\exp(i\varphi_{m,n}) \quad (15)$$

where the $\phi_1$ are selected from the set of angles $\{2\pi/N, 4\pi/N, 6\pi/N, \ldots, 2\pi\}$. In general, it is unlikely that any combination of these quantized encoding phases will solve equation (15) exactly. Instead, the set of encoding phases that comes closest to solving equation (15) is used to encode $A_{m,n}$ and $\phi_{m,n}$. This set may be found by trial and error, or alternatively by a Monte Carlo algorithm. Note that this set is not unique; it is equivalent to all of its permutations among the M partitions. As before, the physical depths corresponding to the encoding phases are $\{\lambda\phi_1/2\pi$ modulo $\lambda\}$.

While the invention has been described with respect to a limited number of embodiments, it will be appreciated that many variations, modifications and other applications of the invention may be made.

What is claimed is:

1. A method for making a hologram filter in a transparent material, for reconstructing an image by passing coherent light of a single frequency through the hologram filter, the light having a certain wavelength in the transparent material, comprising the steps of:

(a) computing a transform of the image, said transform having, at each of a plurality of discrete points in a transform space, a transform amplitude A and a transform phase $\phi$;

(b) partitioning the material into a plurality of contiguous pixels of substantially equal dimensions, each said pixel corresponding uniquely to one of the points; and (c) for each point:

(i) determining a set of encoding parameters that correspond to A and $\phi$, said set including at least two encoding phases; and (ii) for each of said at least two encoding phases: forming an optical path length difference, through a part of said corresponding pixel in the material, relative to a reference optical path length, substantially equal to the wavelength of the light in the transparent material multiplied by said each encoding phase modulo $2\pi$.

2. The method of claim 1, wherein said optical path length difference is formed by varying a refractive index of the filter.

3. The method of claim 1, wherein said optical path length difference is formed by photodeposition.

4. The method of claim 1, wherein said optical path length difference is formed by etching.

5. The method of claim 1, wherein said set of encoding parameters includes two of said encoding phases, $\phi^{(1)}$ and $\phi^{(2)}$ which are determined by solving a pair of equations including a first equation, $$A = \cos\left(\frac{\varphi^{(1)} - \varphi^{(2)}}{2}\right)$$

and a second equation, $$\varphi = \frac{\varphi^{(1)} + \varphi^{(2)}}{2};$$

wherein said optical path length difference for $\phi^{(1)}$ is formed in a first half of said pixel, and wherein said optical path length difference for $\phi^{(2)}$ is formed in a second half of said pixel.

6. The method of claim 1, wherein said set of encoding parameters includes three of said encoding phases, $\phi_1$, $\phi_2$, and $\phi_3$, which are determined by selecting $\phi_1$, $\phi_2$, a first fraction, $p_1$, and a second fraction, $p_2$, such that $A\exp(i\phi)$ is substantially equal to $p_1\exp(i\phi_1)+p_2\exp(i\phi_2)$, wherein said optical path length difference for $\phi_1$ is formed in substantially said first fraction of said pixel, wherein said optical path length difference for $\phi_2$ is formed in substantially said second fraction of said pixel, and wherein said optical path length difference for $\phi_3$ is formed in substantially a first half of a remainder of said pixel.

7. The method of claim 6, further comprising the step of:
(d) for each point: forming an optical path length difference, in substantially a second half of said remainder of said pixel, relative to said reference optical path length, substantially equal to the wavelength of the light in the transparent material multiplied by $(\phi_3+\pi)$ modulo $2\pi$.

8. The method of claim 6, wherein said first encoding phase, said second encoding phase, and said third encoding phase are selected from the group of real numbers consisting of 0, $\pi/2$, $\pi$, and $3\pi/2$.

9. The method of claim 1, further comprising the step of:
(d) for each point, selecting an area partition number, M, and a phase partition number, N, said set of encoding parameters including M of said encoding phases $\phi_1$, which are determined by selecting said $\phi_1$ such that a complex number obtained by summing all M exponentials $\exp(i\phi_1)$ is approximately equal to $MA\exp(i\phi)$, each of said $\phi_1$ being selected from the group of real numbers consisting of integral multiples of $2\pi/N$ between $2\pi/N$ and $2\pi$, and wherein, for each of said $\phi_1$, said optical path length difference for said each $\phi_1$ is formed in a fraction 1/M of said pixel.

10. The method of claim 9, wherein said selecting of said encoding phases is done by a Monte Carlo method.

11. The method of claim 1, wherein said set of encoding parameters includes two of said encoding phases, $\phi^{(1)}$ and $\phi^{(2)}$, and a fraction, p; where said determining of said encoding parameters is effected by steps including:

(A) selecting a first discrete set of quantized phases $\phi^{(1)}_q$;
(B) selecting a second discrete set of quantized phases $\phi^{(2)}_q$;
(C) combining each of said discrete values of $\phi^{(1)}_q$ and each of said discrete values of $\phi^{(2)}_q$ to form a phase pair $(\phi^{(2)}_q, \phi^{(2)}_q)$;

(D) for each said phase pair, solving at least one (equation, selected from the pair of equations including a first equation $$A = \sqrt{2p^2 - 2p + 1 + p(1-p)\cos(\varphi^{(1)} - \varphi^{(2)})}$$

and a second equation, $$\varphi = \tan^{-1}\left[\frac{p\sin\varphi^{(1)} + (1-p)\sin\varphi^{(2)}}{p\cos\varphi^{(1)} + (1-p)\cos\varphi^{(2)}}\right],$$

for p, thereby providing at least one trial value of p for each of said phase pairs;
(E) selecting a preferred said phase pair, said selecting being based on said at least one trial value of p;
(F) setting $\phi^{(1)}$ equal to $\phi^{(1)}_q$ of said preferred phase pair, and
(H) setting $\phi^{(2)}$ equal to $\phi^{(2)}_q$ of said preferred phase pair.

12. The method of claim 11, wherein, for each said phase pair, said first equation is solved to provide a first said trial value of p and said second equation is solved to provide a second said trial value of p, said preferred phase pair then being said phase pair for which a difference between said first trial value of p and said second trial value of p is smallest.

13. The method of claim 12, wherein said determining of said encoding parameters further includes the step of:
(H) setting said fraction p equal to an average of said first trial value of p for said preferred phase pair and said second trial value of p for said preferred phase pair.

14. The method of claim 11, wherein, for each said phase pair, only said first equation is solved to provide only one said trial value of p, said only one trial value of p then being plugged into said second equation, along with said each phase pair, to provide a predicted value of said transform phase, said preferred phase pair then being said phase pair whose predicted value of said transform phase is closest to said transform phase.

15. The method of claim 14, wherein said determining of said encoding parameters further includes the step of:
(H) setting said fraction p equal to ;aid trial value of p corresponding to said preferred phase pair.

16. The method of claim 11, wherein, for each said phase pair, only said second equation is solved to provide only one said trial value of p, said only one trial value of p then being plugged into said first equation, along with said each phase pair, to provide a predicted value of said transform amplitude, said preferred phase pair then being said phase pair whose predicted value of said transform amplitude is closest to said transform amplitude.

17. The method of claim 16, wherein said determining of said encoding parameters further includes the step of:
(H) setting said fraction p equal to said trial value of p corresponding to said preferred phase pair.

18. A hologram filter for reconstructing, by passing coherent light of a single frequency through the filter, an image whose transform has, at each of a plurality of discrete points in transform space, a transform amplitude, A, and a transform phase, $\phi$, the filter comprising a sheet of a substantially transparent material, wherein the light has a certain wavelength, at least a portion of said sheet being subdivided into a plurality of contiguous pixels of substantially equal dimensions, each of said pixels corresponding uniquely to a unique one of the points in transform space, a first partition of each of said pixels having an optical path length difference, relative to a reference optical path length, substantially equal to said wavelength of the light in said transparent material multiplied by a first encoding phase, determined from A and φ of the corresponding point, modulo $2\pi$, and a second partition of each of said pixels having an optical path length difference, relative to said reference optical path length, substantially equal to said wavelength of the light in said transparent material multiplied by a second encoding phase, determined from A and φ of the corresponding point, modulo $2\pi$.

19. A method for making a hologram filter in a transparent material, for reconstructing an image by passing coherent light of a single frequency through the hologram filter, the light having a certain wavelength in the transparent material, comprising the steps of:

(a) computing a transform of the image, said transform having, at each of a plurality of discrete points in a transform space, a transform amplitude A and a transform phase φ;

(b) partitioning the material into a plurality of contiguous pixels, each said pixel corresponding uniquely to one of the points; and (c) for each point:

(i) determining two encoding phases, $\phi^{(1)}$ and $\phi^{(2)}$, by solving a pair of equations including a first equation, $$A = \cos\left(\frac{\varphi^{(1)} - \varphi^{(2)}}{2}\right)$$

and a second equation, $$\varphi = \frac{\varphi^{(1)} + \varphi^{(2)}}{2},$$

(ii) forming an optical path length difference, through a first half of said corresponding pixel in the material, relative to a reference optical path length, substantially equal to the wavelength of the light in the transparent material multiplied by $\phi^{(1)}$ modulo $2\pi$; and (iii) forming an optical path length difference, through a second half of said corresponding pixel in the material, relative to said reference optical path length, substantially equal to the wavelength of the light in the transparent material multiplied by $\phi^{(2)}$ modulo $2\pi$.

20. A method for making a hologram filter in a transparent material, for reconstructing an image by passing coherent light of a single frequency through the hologram filter, the light having a certain wavelength in the transparent material, comprising the steps of:

(a) computing a transform of the image, said transform having, at each of a plurality of discrete points in a transform space, a transform amplitude A and a transform phase φ;

(b) partitioning the material into a plurality of contiguous pixels, each said pixel corresponding uniquely to one of the points; and (c) for each point:

(i) determining two encoding phases, $\phi^{(1)}$ and $\phi^{(2)}$, and a fraction, p, by steps including:

(A) selecting a first discrete set of quantized phases $\phi^{(1)}_q$;

(B) selecting a second discrete set of quantized phases $\phi^{(2)}_q$;

(C) combining each of said discrete values of $\phi^{(1)}_q$ and each of said discrete values of $\phi^{(2)}_q$ to form a phase pair $(\phi^{(2)}_q, \phi^{(2)}_q)$;

(D) for each said phase pair, solving at least one equation, selected from the pair of equations including a first equation $$A = \sqrt{2p^2 - 2p + 1 + p(1-p)\cos(\varphi^{(1)} - \varphi^{(2)})}$$

and a second equation, $$\varphi = \tan^{-1}\left[\frac{p\sin\varphi^{(1)} + (1-p)\sin\varphi^{(2)}}{p\cos\varphi^{(1)} + (1-p)\cos\varphi^{(2)}}\right],$$

for p, thereby providing at least one trial value of p for each of said phase pairs;

(E) selecting a preferred said phase pair, said selecting being based on said at least one trial value of p;

(F) setting $\phi^{(1)}$ equal to $\phi^{(1)}_q$ of said preferred phase pair; and (G) setting $\phi^{(2)}$ equal to $\phi^{(2)}_q$ of said preferred phase pair, and (ii) for each of said encoding phases: forming an optical path length difference, through a part of said corresponding pixel in the material, relative to a reference optical path length, substantially equal to the wavelength of the light in the transparent material multiplied by said each encoding phase modulo $2\pi$.

\* \* \* \* \*